United States Patent [19]
Whitener

[11] Patent Number: 4,725,020
[45] Date of Patent: Feb. 16, 1988

[54] CONTROL SYSTEM INCORPORATING STRUCTURAL FEEDBACK

[75] Inventor: Philip C. Whitener, Seattle, Wash.

[73] Assignee: The Boeing Company, Seattle, Wash.

[21] Appl. No.: 510,738

[22] Filed: Jul. 5, 1983

Related U.S. Application Data

[63] Continuation of Ser. No. 214,583, Dec. 9, 1980, abandoned.

[51] Int. Cl.⁴ .................................................. B64C 13/16
[52] U.S. Cl. ................................... 244/76 R; 244/76 C
[58] Field of Search ............... 244/75 R, 75 A, 76 R, 244/76 C, 175, 194; 73/768, 775, 781, 802; 340/870.06, 870.35

[56] References Cited

U.S. PATENT DOCUMENTS

| | | | |
|---|---|---|---|
| 2,332,516 | 10/1943 | Kemmer | 244/75 |
| 2,361,071 | 10/1944 | Vang | 188/1 |
| 2,416,958 | 3/1947 | Sears | 244/13 |
| 2,448,712 | 9/1948 | Hampshire | 244/44 |
| 2,474,585 | 5/1949 | Lloyd | 244/13 |
| 2,496,565 | 2/1950 | Stalker | 244/42 |
| 2,523,427 | 9/1950 | Hampshire | 244/44 |
| 2,996,267 | 8/1961 | Warren | 244/14 |
| 3,136,154 | 6/1964 | Christensen | 73/775 |
| 3,184,188 | 5/1965 | Rossire | 244/194 |
| 3,279,725 | 10/1966 | Andrew et al. | 244/77 |
| 3,347,498 | 10/1967 | Priestley et al. | 244/77 |
| 3,362,663 | 1/1968 | Wehrmann | 244/130 |
| 3,412,961 | 11/1968 | Howard | 244/77 |
| 3,734,432 | 5/1973 | Low | 244/77 |
| 3,774,864 | 11/1973 | Hurkamp | 244/13 |

FOREIGN PATENT DOCUMENTS 625636  6/1949  United Kingdom .............. 244/76 C

OTHER PUBLICATIONS

ANC-23 Bulletin, "Sandwich Construction for Aircraft", Feb. 1951.
"Distributed Load Aircraft Concepts", from Journal of Aircraft, by P. C. Whitener, vol. 16, No. 2, Feb. 1979, pp. 72-77.

Primary Examiner—Sherman D. Basinger
Assistant Examiner—Rodney Corl
Attorney, Agent, or Firm—Delbert J. Barnard

[57] ABSTRACT

Strain gages embedded in an upper skin structure portion of the wing, near the centerline axis, measures centerline moment and produces a feedback signal used for adjusting the control surfaces of the wing, to produce stabilizing forces. This enables the wings to be designed primarily for strength, not stiffness.

12 Claims, 13 Drawing Figures

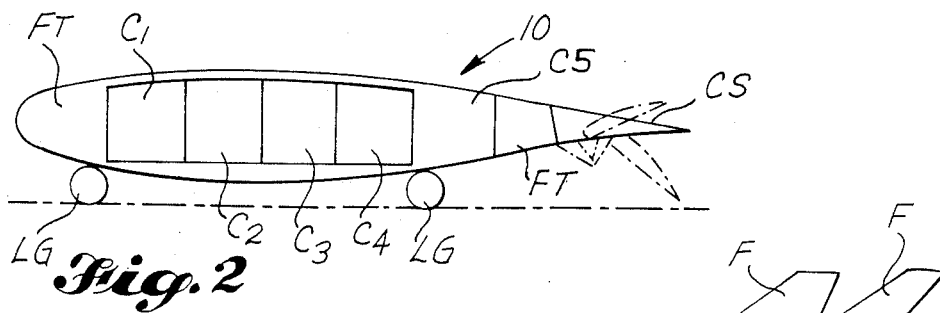

CONTROL SYSTEM INCORPORATING STRUCTURAL FEEDBACK

This application is a continuation of application Ser. No. 214,583, filed Dec. 9, 1980, now abandoned.

BACKGROUND OF THE INVENTION

1. Field of the Invention

The present invention relates to aircraft design, and more particularly to a method and system for utilizing structural feedback, for operating control surfaces on the aircraft to produce stabilizing forces, enabling the aircraft to be designed primarily for strength but not stiffness.

2. Description of the Prior Art

It has been proposed to significantly increase the payload of aircraft by placing all of the payload in the wing of the aircraft so that a close match will be obtained between aerodynamic loading and mass loading. Specific aircraft designs, and the distributed load concept on which such designs are based, are quite thoroughly discussed in an article entitled, *Distributed Load Aircraft Concepts*, by Philip C. Whitener, appearing in the Journal of Aircraft, Volume 16, No. 2 Feb. 1979, Pages 72-77. This article and the articles and reports mentioned in it are hereby incorporated by reference into this disclosure.

An aircraft built large enough to carry the large payloads described in the aforementioned article would be unacceptably heavy if built stiff enough to avoid aerodynamic stability problems. Also, optimum wing size depends on what unit weight (lbs/sq ft. of area) can be achieved. Larger wing sizes have certain synergistic advantages, listed below, and become optimum with lower unit weights. However, making the wings of a more conventional size airplane larger, with the same or less weight, might present aerodynamic instability problems (including flutter, control reversal, etc., i.e. stiffness problems), along with a need for load distribution control (i.e. strength problems).

A principal object of the present invention is to provide a manner of solving stability problems that would otherwise be associated with the large, limber aircraft of the type mentioned in the foregoing article, or with the more conventional sized aircraft having wings of lower unit weight.

The synerginic benefits arising from lower unit weight of aircraft wings (larger optimum wing size) include:

(1) Higher L/D ($b^2 A_{wet}$);
(2) Lower noise;
(3) Simpler flaps;
(4) Shorter field length;
(5) More growth potential;
(6) Better cruise altitude and
(7) Safer low speed performance.

Known systems in which some form of structural feedback is used for positioning control surfaces to produce aerodynamic forces which counter other forces acting on the aircraft structure are disclosed by U.S. Pat. No. 3,279,725 granted Oct. 18, 1966, to Gustav M. Andrew and John M. Johnson, Jr.; by U.S. Pat. No. 3,347,498, granted Oct. 17, 1967 to Eric Priestley and Anthony E. Hodson; by U.S. Pat. No. 3,412,961, granted Nov. 26, 1968 to James C. Howard and by U.S. Pat. No. 3,734,432, granted May 22, 1973, to George M. Low.

Each of the systems disclosed by the above patents uses accelerometers for measuring loads. The system and method of the present invention is specifically addressed to the problem of stabilizing large, structurally limber wings. Accelerometer data is not unique to any specific structure or load direction in a structure and for this reason accelerometer systems are not well suited for measuring the tendency of a wing to bend in response to center line moments.

SUMMARY OF THE INVENTION

A basic aspect of the present invention is to provide an aircraft which has relatively limber wings with strain gage means embedded in a skin portion of a wing, for measuring bending moment induced strain. A signal proportional to strain (and hence to bending moment) is used as an input to control apparatus for control surfaces on the aircraft, to cause movement of the control surfaces in a direction and in a sufficient amount to produce aerodynamic forces acting on the aircraft wings for opposing bending.

In preferred form, this type of structural feedback is combined with angle-of-attack and acceleration feedback. This approach of using structural feedback enables an airplane, made light weight by being designed for strength (not stiffness), to be feasible.

A principal feature of one aspect of the invention is to provide the aircraft with a large number of control surfaces, each of which is adapted to be activated with whatever feedback is necessary to achieve a desired result.

Preferrably, each control surface is positioned by use of a digital signal controlled actuator means and a digitizer means is provided for converting the strain measurement of the strain gage means into a digital feedback system, to serve as one of the control inputs for the actuator means.

In one embodiment, the strain gage means may comprise a calibrated strain gage that is incapsulated within a beam member and such beam member is structurally integrated into the upper skin portion of a wing. The strain gage carrying beam member may be located within layers of a resinous material which are built up in a cavity formed in a honeycomb core portion of the skin structure, to provide reinforcement for the skin structure in the region of the strain gage carrying beam member.

In preferred form, a plurality of strain gage means are embedded in the skin structure during manufacture. Two or more of them may be used together, to provide redundancy, and some additional strain gages may be provided as spares.

The structural feedback system and method of the present invention is advantageously employed with a distributed load type aircraft. Distribution of the payload throughout the wing structure by itself reduces the unit weight of the aircraft. The use of structural feedback in such an aircraft further reduces its weight.

These and other important objects and advantages of the invention will be more particularly brought forth upon reference to the accompanying drawings, the detailed description of the invention, and the claims.

BRIEF DESCRIPTION OF THE DRAWINGS

FIG. 1 is a top plan view of a distributed load aircraft, including x's showing landing gear locations and broken lines showing the internal wing spars;

FIG. 2 is a cross-sectional view taken through the wing at essentially any station along its length, with internal comparment detail omitted;

FIG. 3 is a diagrammatic cross-sectional view of the wing showing the general flow pattern of air over the wing;

DESCRIPTION OF THE PREFERRED EMBODIMENT

Figure 4:
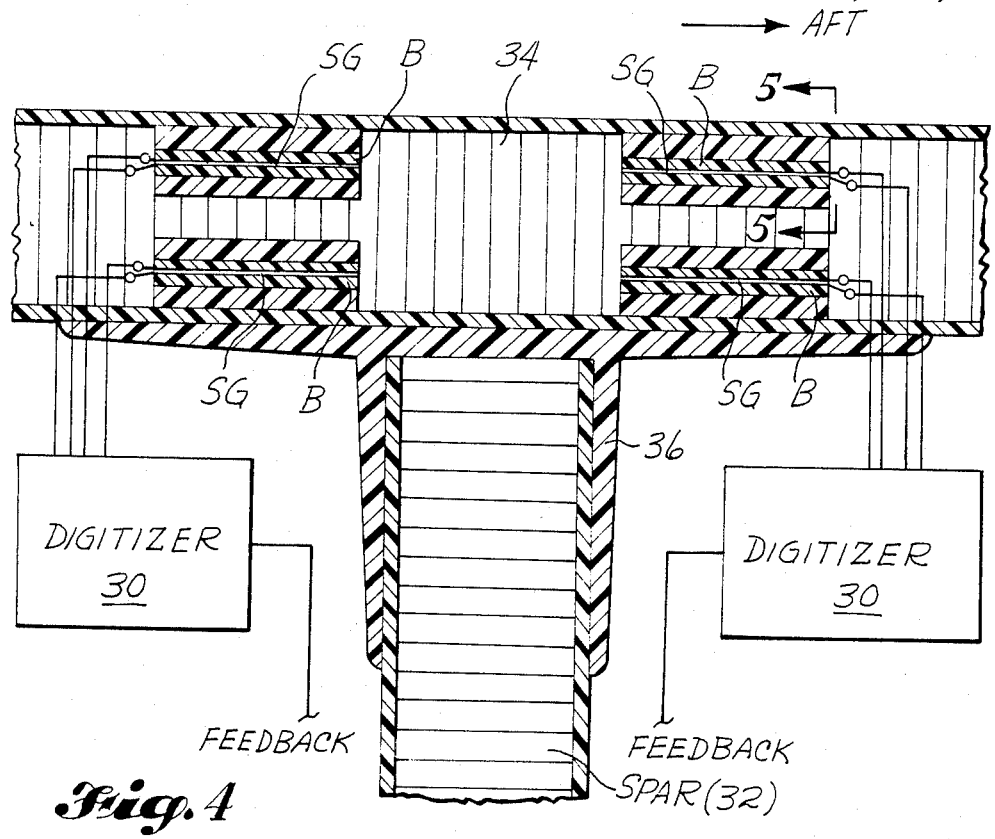
FIG. 4 is an enlarged scale detailed view of a spar to skin joint detail, taken at a mid-chord location adjacent the centerline of the aircraft, such view showing a group of four strain gauges incorporated within the skin panel.

The distributed load aircraft 10 shown by FIGS. 1-3 is the same embodiment of distributive load freighter that is discussed in some detail in the aforementioned article entitled "Distributed Load Aircraft Concepts." The judicious use of a composite structure and digital control of active control surfaces for gust alleviation, flutter suppression, and maneuver load control, and their contribution to reductions in bending moments and the achievement of significantly lower structural weight fractions is well discussed in such article and for that reason will not be repeated in this specification.

As described in the article, the wing structure may comprise a large number (e.g. over 300) identical ribs made of bonded graphite epoxy honeycomb on 30 inch spacing. The wing surfaces may be constructed from graphite epoxy honeycomb made in continuous planks which are joined at the airplane centerline CL. As also mentioned in the article, it is expected that the aircraft 10 be controlled by digital controls and fly-by-wire or fiber optics.

As shown by FIG. 1, multiple landing gears, some of which are labeled LG, are distributed along the span to preclude concentrated loads that would be incompatible with the minimum gage structure used throughout the wing. A very large number of control surfaces, some of which are designated CS, are distributed along the rear edge of the wing structure. These control surfaces CS function both as flaps and primary flight controls. The aircraft further includes wing tip fins F which provide directional and engine-out control. Operated together, they function as both a redundant pitch control and as side force generators.

The stability and control of distributed load airplanes is very similar to that of any other configuration. The airplane must be balanced and must have enough control power to execute the required maneuvers. The use full-span controls in addition to the tip fins must result in enough control over the existing variables to provide a satisfactory solution to every flight condition.

As clearly shown by FIG. 1 and 3, the engines, some of which are designated E, are positioned above and slightly forwardly of the wing. The inlet flow pattern and the flow pattern of air across the wing is shown by FIG. 3.

As discussed in the article, the wing tips function as doors or covers for access openings into the cargo space. By way of typical example, the interior of the aircraft may comprise a central set of four tunnel-like cargo compartments, C1, C2, C3, C4 sized, for example, to receive 8 ft.×8 ft.×20 ft container so each compartment C1, C2, C3, C4 extends essentially the full length of its wing. An additional smaller compartment C5 for smaller size cargo containers, or for automobiles, for example, is located behind cargo space C4.

Fuel tanks FT are provided both forwardly and aft of the cargo carrying compartments. Preferably, much of the fuel is carried in the rear tanks and the forward tanks function as feeder tanks. The landing gear units LG retract vertically and are stowed in the forward and trailing compartments, between the fuel tanks.

Figure 6:
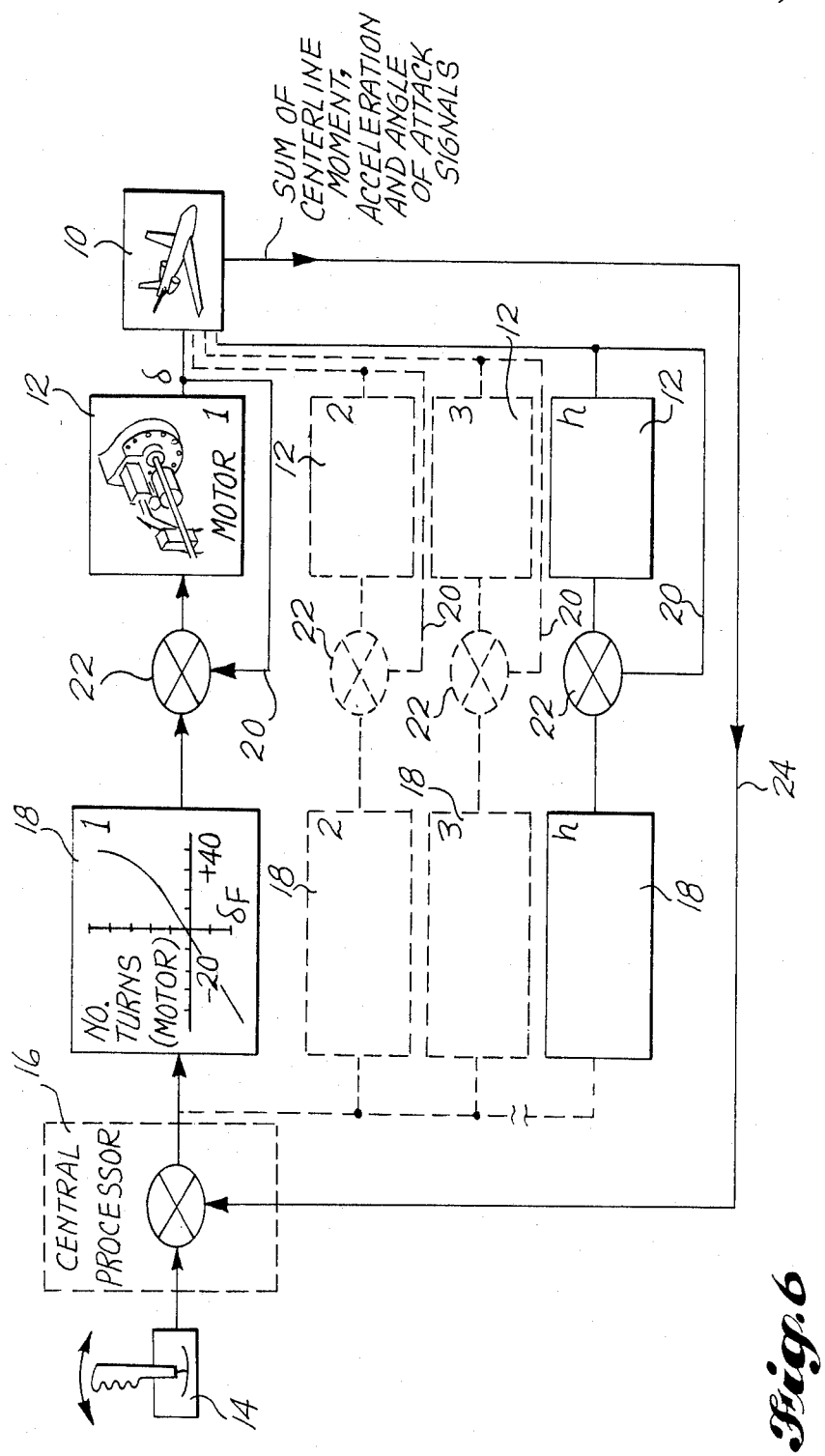
FIG. 6 is a diagram of a control system incorporating structural feedback in accordance with the present invention.

Referring now to FIG. 6, the basic control system comprises a plurality of actuators 12, one for each of the control surfaces CS. The control system includes a pilot input 14 into a central processor 16 which sends control signals to a control means for each of the actuators 12. In the preferred embodiment, digital signal controlled actuators are used and these may be in the form of either rotary or linear hydraulic or electrical stepping motors. As diagrammed in FIG. 6, a command input 18, representing a particular number of steps and a particular direction is sent by the central processor 16 to each actuator 12. A feedback signal from each control surface is fedback to a summing station 22 and is used for adjusting the command input to the actuator 12 for such control surface. In addition, in accordance with the present invention, a structural feedback signal 24 is delivered from digitizers associated with sensors on the aircraft 10, for measuring centerline moment, acceleration and angle-of-attack forces on the aircraft. A composite signal (or separate signals) representing these forces is fed back to the central processor 16 and functions to appropriately adjust the command inputs 18 to the various control surface actuators.

In accordance with an aspect of the present invention, centerline moments are directly measured by means of strain gages SG which are embedded within the wing structure, at the base of one or both of the wings. In the preferred embodiment, a set of four strain gages SG is embedded at each of two locations 26, 28, located on opposite sides of the aircraft centerline CL (FIG. 1), adjacent a center spar, at substantially the thickest part of the wing chord.

Figure 5:
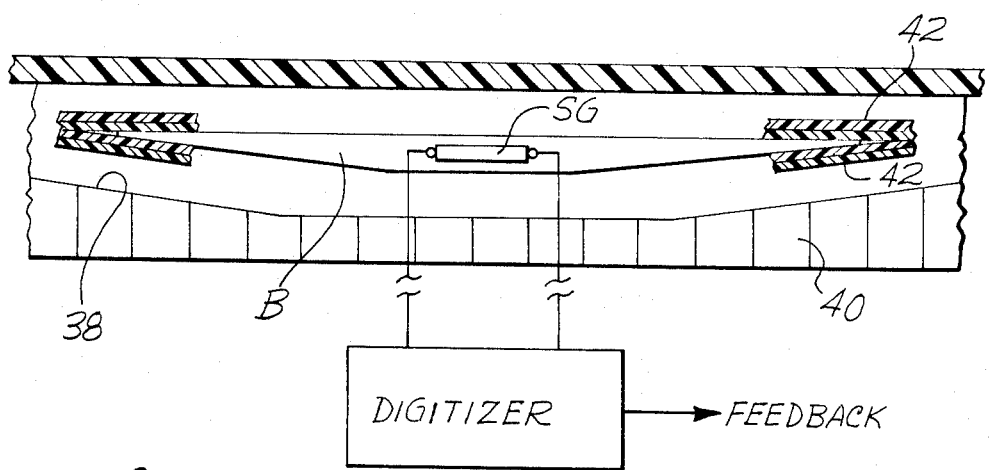
FIG. 5 is a fragmentary sectional view in yet a larger scale, taken substantially along line 5—5 of FIG. 4, and showing one of the strain gages encapsulated within a beam member and showing the beam member within a reinforced section of the core.

As best shown by FIGS. 4 and 5, each strain gage is embedded or encapsulated within an elongated beam B, shown in FIG. 5 to have a thickened center portion and to gradually taper from such center portion out to its ends. Each strain gage SG is precalibrated and includes a terminal block at one end, shown diagrammatically in FIGS. 4 and 5. Wires extend from the terminals of the strain gages SG to digitizers 30 which may be located within the wing structure. By way of typical and therefore non-limited example, the digitizers 30 may be mounted adjacent spar 32 and output wires from the digitizers may extend along the spar to connect with the next component of the feedback system.

As mentioned above, each strain gage SG may be encapsulated within a beam B and each is thoroughly checked out and approved before it is installed within the skin structure 34 of the aircraft. Bonded graphite epoxy honeycomb of the type described in the aforementioned article may be used for both the skin structure 34 and the spars 32. A suitable connector 36 may be provided between each spar 32 and the portion of the skin structure 34 to which it is connected. The connector 36 is bonded to both structures and provides reinforcement of the joint.

The strain gages SG may be embedded within the skin structure as shown by FIGS. 4 and 5, (cavities which are similar in shape to the beam structure B, but larger, may be formed in upper and lower core portions of the skin structure 34. The beam may be set into layers of graphite epoxy which are built up one layer at a time within the cavities. Fragmentary portions of the layers are shown in FIG. 5 and some of them are labeled 42. The embedding material 42 and the beam structure defines a solid reinforced section of the skin structure in the region of each strain gage which will deflect predictably under load.

Only one strain gage is necessary. However, it is desirable to provide a plurality of them. The illustrated embodiment involves a set of four strain gages SG on each side of the centerline CL, or eight strain gages in total. A plurality of strain gages SG are put in use at any one point of time, to provide redundancy. The remaining strain gages SG are provided to serve as spares, to be used at some future time in the event of a malfunction of the originally employed strain gages SG.

As is well known, the strain gage is a part of an electrical circuit and bending in the vicinity of the strain gage SG will change the resistance of the strain gage and such change in resistance is an accurate measurement of the moment causing bending. This signal is an analog signal and for that reason a digitizer 30 is provided for converting such analog signal to a digital signal for use in the digital control system. Of course, in an installation in which an analog control system is used, no conversion is necessary.

The following is a discussion of a study conducted with respect to the illustrated embodiment of the invention and is included herein to provide a better understanding of the basic principles of the invention:

INTRODUCTION AND SUMMARY

One of the objectives of the design of this airplane was to achieve minimum structural weight with no restriction, at least initially, on the use of active controls. The airplane requires an active control system for flight at any speed. For purposes of this study, it was assumed acceptable to rely on the control system to provide both static aeroelastic and flutter stability within the normal operating envelope. FIG. 1 shows a plan view and wing cross section of this Distributed Load Feighter. One principal feature of such aircraft is that it includes many control surfaces CS which can each be activated with whatever feedback is necessary to achieve a desired result.

The results of this study show that a huge saving in primary structural weight is possible.

This study also introduces a method of representation that is relatively simple and represents the full spectrum of aeroelasticity from steady state and static stability thru flutter and dynamic loads.

Figures 12, 13:
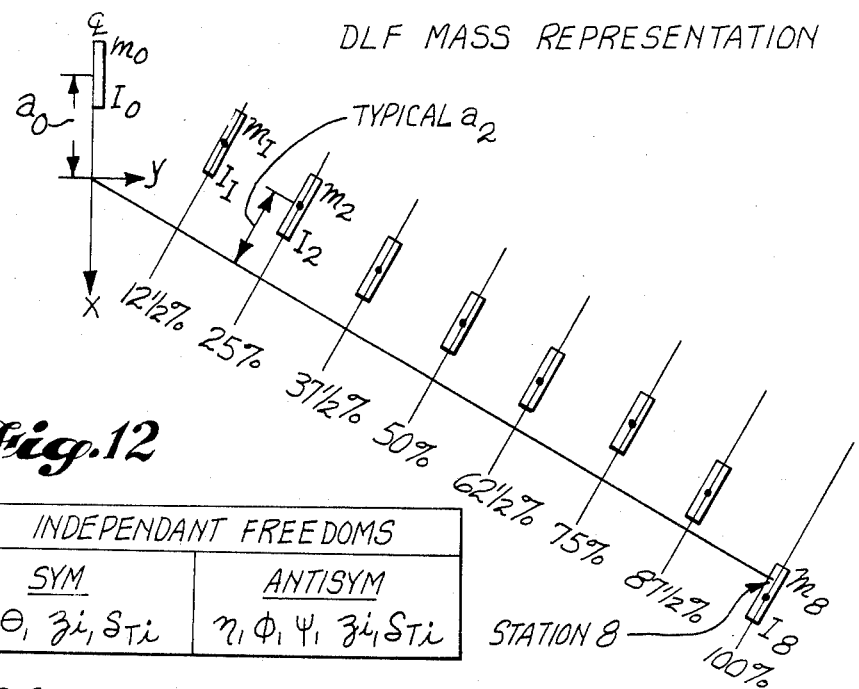
FIG. 12 is a plan view of a half wing math model.
FIG. 13 is a matrix of lifts and torques at the elastic axis stations shown in FIG. 12.

The airplane system is represented by the absolute movement of a centerline mass and the relative deflection of eight additional masses on the half-airplane (FIG. 12). A matrix describing the motion, stresses, angle of attack, aerodynamics with unsteady lags, and feedback at each station is established (FIG. 13). Solution by an existing rooting program provides the following data:

1. Root locus showing stability (including flutter) as a function of some parameter variation.
2. Time response due to any input such as a $(1-\cos ine)$ gust or a control surface deflection.
3. Frequency response (to aid control system synthesis).
4. Gust spectral analysis (alternate dynamic loads analysis).

RESULTS AND DISCUSSION

Stability and Gust Loads

Figure 7:
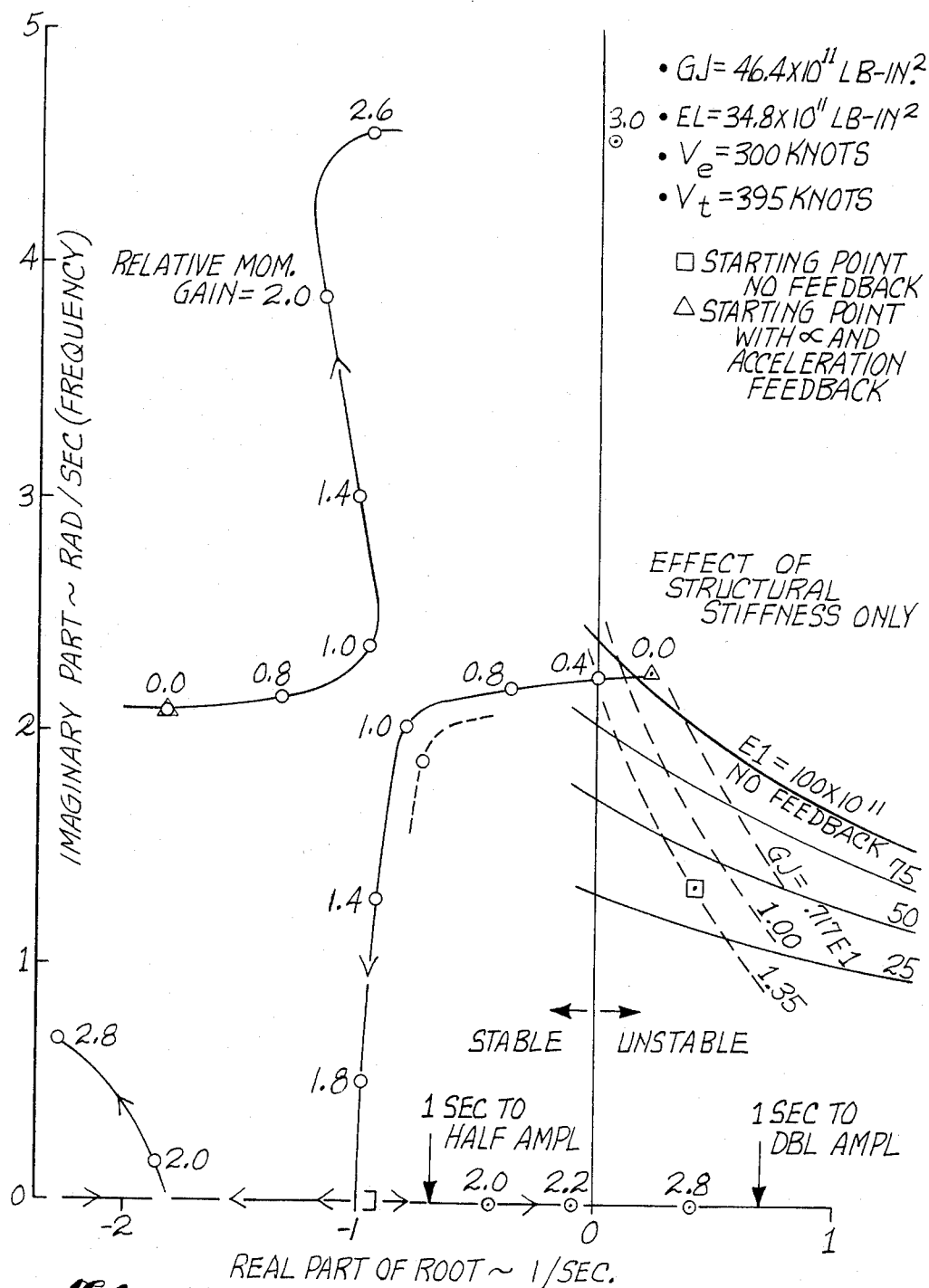
FIG. 7 is a graphical presentation of the effect of centerline moment feedback on aircraft stability.

The tremendous stability improvement due to feedback is illustrated in FIG. 7 which shows the low frequency part of a root locus for a recent run configuration with moment gain as a parameter. (Symmetric motion, $V_e=300$ knots, $V_f=395$ knots, $EI-34.8\times10^{11}$, $GJ=46.4\times10^{11}$ lb-in$^2$ uniform, $GW=3,000,000$ lbs, very rough estimate of pitch inertia distribution). Relative gain of the filtered centerline moment feedback is varied. The gain for angle-of-attack and acceleration feedback is held at a predetermined constant level found to give good gain margin and acceptable gust laods (see below). All higher frequency roots are adequately stable for the gains shown.

It will be seen that the system is stable for any gain between 0.39 and 2.28. At a gain less than 0.39, it is unstable at 2.2 rad/sec (0.35 HZ). At a gain greater than 2.28, it becomes statically unstable, as shown by the root moving to the right on the real axis for gain greater than 1.9.

Figure 8:
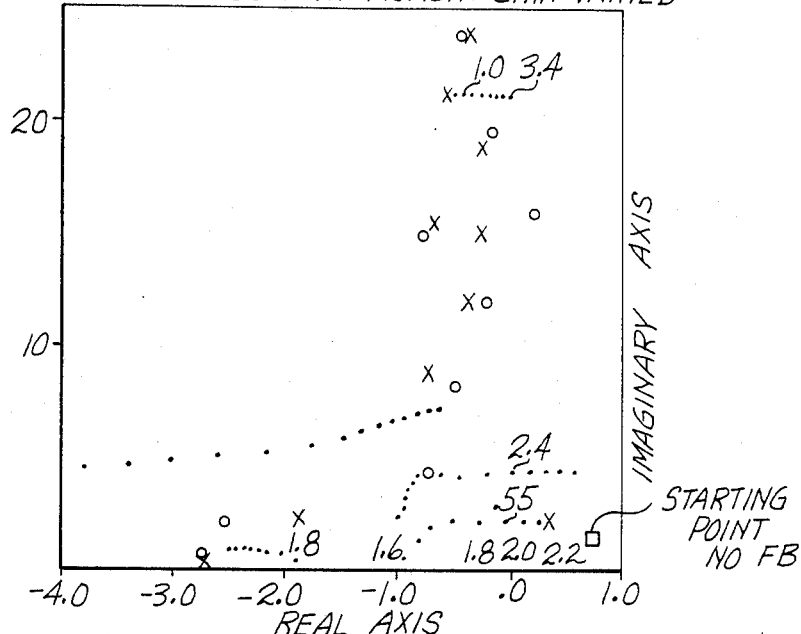
FIG. 8 is a root locus diagram comparing a system without moment feedback to a system with infinite moment feedback gain.

A later run showed that, with EI held at $34.8\times10^{11}$ and GJ dropped to the same value, the stability was only slightly deteriorated, as partially shown by the dotted line in FIG. 7. The machine produced root locus of FIG. 8 shows additional details for this case. The X's represent the system without moment feedback and the O's represent it with infinite moment feedback gain. Note the compressed vertical scale.

There are three roots of interest here:
1. The primary 2.0 rad/sec root which requires a gain of at least 0.55 but no more than 2.0 to be stable.
2. The 4.1 rad/sec root which becomes unstable for gain greater than 2.4.
3. The 21.2 rad/sec root which becomes unstable for gain greater than 3.4.

The later two roots are of academic interest only since the primary root determines the usable gain range. Six higher modes, not shown, were all well behaved. Roots for gain variation from 1 to 3.2, in 0.2 increments, are shown. It would appear that 1.0 is the optimum relative gain.

The feedback gains used for the above cases at 300 KEAS and relative moment gain=1.0 were as follows:
1. 1.43 degrees at each control surface per 100 million inch-lb wing bending moment at airplane centerline (Upper surface compression causes TE up at all TE controls).

2. 2.21 degrees CS per G (Upward acceleration at any station causes TE down at corresponding TE control).
3. 1.0 degree CS per degree angle-of-attack (Measured nose up at any panel causes TE down at corresponding TE control).

It will be noted that some of the feedback polarities do not seem to be in a load alleviating direction. The situation is complicated by the phenomenon of reversal. However, the improvement in stability seemed to lower the gust loads. It is quite probable that a more complicated distribution of gains could produce a more optimum combination of load alleviation and stability.

It was found that, if the moment and acceleration feedback gains were made proportional to $1/V_e^2$, the system was adequately stable with good gain margin for the full range of possible $V_e$'s at $V_t=395$ knots. Other $V_t$'s were not investigated in this limited study.

A simple second order low pass filter in the moment feedback considerably improved gain margin. $G(S)=1/(0.05S+1)^2$ It was included above. Control lags in the other two feedbacks were detrimental and thus not included.

FIG. 7 also shows the stiffness required to achieve stability without feedback. From a static strength standpoint, the bending stiffness chosen is more than ample, but to be even marginally stable without feedback would require a prohibitive increase in stiffness and consequent increase in weight. This was the basis for the initial choice of EI and GJ. It was later found that a more conventional GJ to EI ratio was also acceptable when feedback was present.

Figure 9:
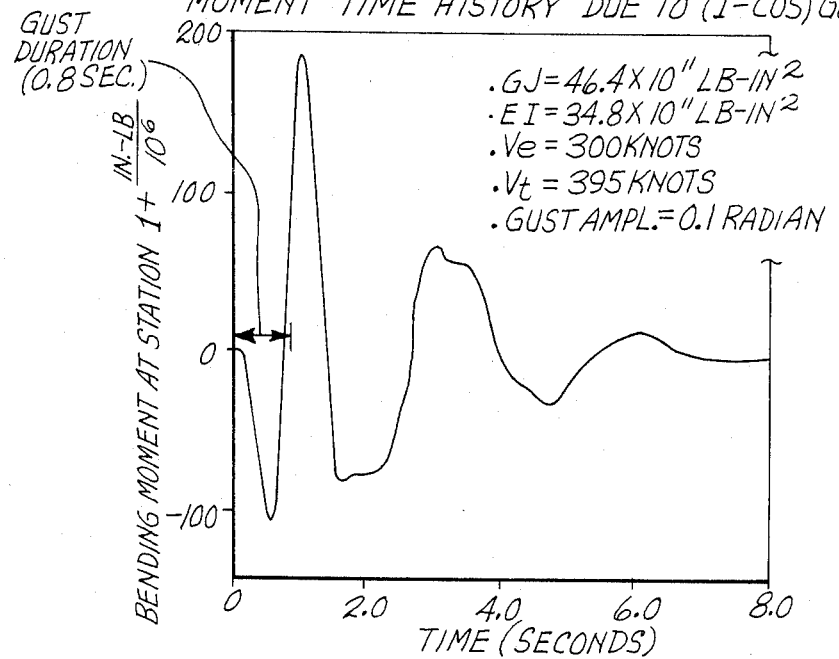
FIG. 9 is a plot of moment time history at station 1 (FIG. 12) due to a (1−cos) gust.

FIG. 9 shows the moment time history at Station 1 for the configuration of FIG. 7 at a relative gain of 1.0 due to a (1−cos) gust of magnitude 0.1 radian and duration of 0.80 seconds. (50.7 ft/sec equivalent, 5.8 chord length). This is just one of seventy variables that could have been observed.

Figure 10:
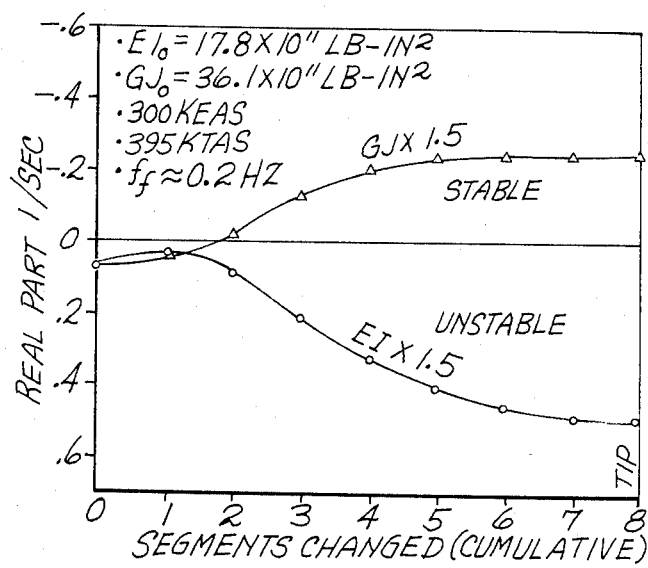
FIG. 10 is a plot showing flutter versus local stiffness.

FIG. 10 shows the relative influence on flutter stability of added bending or torsional stiffness at various points on the wing. It can be seen that segments 3 and 4 have the most influence. Note that an increase in only EI actually deteriorates stability. This is for an earlier, more flexible configuration but should be applicable in general. These flexibilities corresponded to the structural weight assumed in the original performance study.

It should be pointed out that flutter is definitely a part of this study and the word "stability" should always be interpreted as including flutter. Unsteady aerodynamics have been simply but adequately represented for this study by a first order transfer function of the form $(ATS+1)/(TS+1)$ at each panel. "A" and "T" are chosen for aspect ratio=6 and Mach number=0.6.

Representation of details, such as flexible nacelle beams, were not considered at this early stage of development. When a more precise airplane has been defined these details would eventually have to be included, as they do have an effect on stability. At that point a finite element panel type math model and second order unsteady aerodynamics might be considered.

Also, the part of the study involving airspeed was concentrated at the moderate speed of 395 KTAS. Now that it has been shown that it is possible to stabilize this extremely flexible airplane with feedbacks at some moderate $V_t$, other $V_t$'s should be investigated so that the flutter boundary can be defined.

A root locus can be obtained for any chosen parameter variation. When it is desired to show the flutter boundary for some configuration including a built in gain changer if required, one simply chooses velocity as the parameter. This can be $V_e$ or $V_t$ or some combination of these, such as along a constant Mach number line. Such would be desirable when aerodynamics used are valid only for a particular Mach number.

Other facets of the problem, such as antisymmetric stability and other gross weights, will have to be investigated.

MANEUVER CAPABILITY

Figure 11:
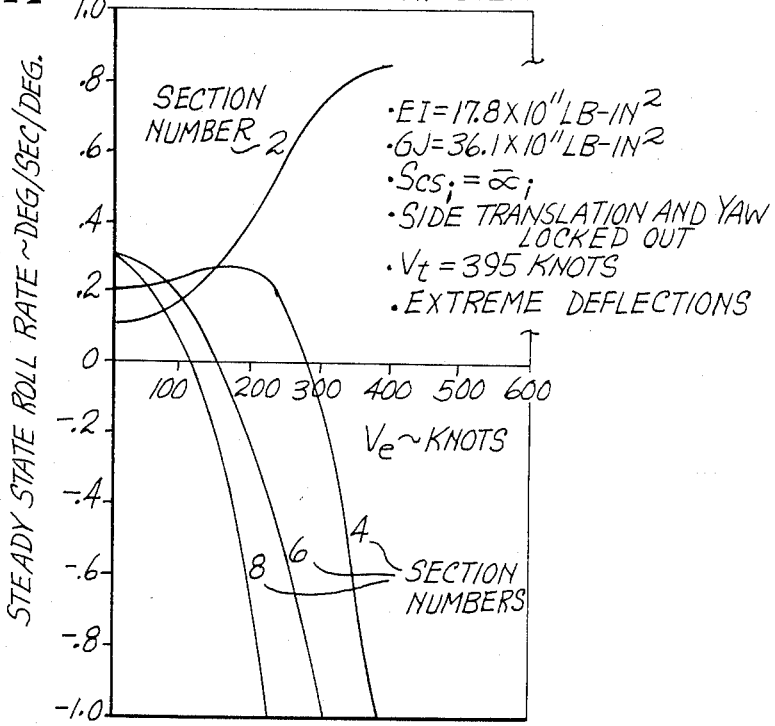
FIG. 11 is a graph depicting roll maneuverability.

FIG. 11 shows roll maneuver effectiveness of control surfaces 2, 4, 6, or 8 for earlier more flexible configuration in antisymmetric motion. It has angle-of-attack feedback to enhance static stability. To simplify interpretation of the response, the only rigid body motion retained was roll. (Side translation and yaw were locked out). Note the very low reversal speed for all surfaces outboard of surface 3. The addition of the other feedbacks and the use of a more reasonable GJ/EI ratio would of course affect these maneuver results and needs further investigation.

The remarkable thing, however, is the effectiveness of the inboard surfaces for this very flexible case. This occurs apparently because the outboard portion of the wing deflects in such a manner as to present very little roll damping resistance to its motion. It should be noted however that the stiffness ratio and level is very unconventional. This could bear further investigation as deflections may be excessive. One way to achieve ample roll maneuverability would be to program gain to the individual control surfaces. The reversal point for each could be determined electronically by continuous monitoring and the gain could be smoothly reversed over a speed change of, say, 100 knots. Since each surface reverses at a different speed, the net result would be continuous maneuverability over the entire speed range. Here again, such a rash departure from the conventional would have to be carefully evaluated on the basis of its merits and its risks.

In the early part of the study before stability was achieved with feedbacks, an attempt was made to get a similar insight into pitch maneuverability. Due to instability it was difficult to separate the steady state pitch rate from the other motion. It was clear, however, that no reversal phenomenon existed. The outboard surfaces merely lost effectiveness at the higher speeds. Further study will be required.

MATH MODEL

A half wing is represented by a continously flexible elastic axis (EA) with a centerline half-mass and eight additional wing masses rigidly attached at uniform intervals as shown in FIG. 12. Aerodynamic forces and torques are also applied at these nine equally spaced attachment points. Call these points EA Stations. The EA is flexible in normal bending and twist only.

A coordinate system is firmly attached, at its origin only, to the wing root with its X-axis along the airplane centerline and its Y-axis parallel to the undeflected wing plane. It takes on all motions of the wing root. Motion of the centerline mass is described by the symmetric or antisymmetric flight path angle of the origin and the orientation angle(s) of the coordinate system. Motion of the remaining masses is described by the above motion plus the normal deflection and twist of the remaining EA stations relative to the coordinate system.

To hold the independent freedoms to a minimum, the wing masses are assumed to have rotary inertia about a line parallel to the EA only. Rotary inertia due to panel width is already more than accounted for by the dumbell effect of mass lumping. Any net inertia perpendicular to the EA remaining after accounting for wing thickness is ignored. This could readily be accounted for, if desired, without additional freedoms by adding inertia bars, each pinned to two adjacent EA stations. The end bar can extend beyond the end station. Bending slope at the EA stations is determined solely by the beam equations and normal bending deflections. It is not an independent freedom. Relative in-plane motion is not allowed. Rigid airplane quantities are used for airplane in-plane motion such as side displacement and yaw.

By comparison, the standard method using generalized coordinates first determines normal modes with no aerodynamics. Then, an arbitrary number of these modes is chosen to represent the system. Unless every mode is used, detail about the system is lost. One never knows whether the lost detail is important or not. Aerodynamics can considerably change the shape of the dominant modes. Also, there is the complication and expense of this additional step. This is particularly significant if a structural parameters study is to be made.

AERODYNAMICS

A streamwise aerodynamic panel is defined between each of the EA stations. The total angle-of-attack, including dynamic effects, at the ¾ chord point midway between the side edges of each panel is assumed to define the panel angle-of-attack. In a separate program the lift distribution due to angle-of-attack of each individual panel is determined for the entire rigid airplane. Each panel has a trailing edge control surface. The lift distribution due to deflection of each individual control surface, including wing tip controls, is also determined. An interface program is used to transform each of the above lift distributions to a matrix of lifts and torques at the EA stations for either the symmetric or antisymmetric representation.

OVER-ALL FORMULATION

FIG. 13 shows the matrix for the entire antisymmetric representation. Each of the large squares represents a given variable for each of the eight wing panels. The first nineteen rows represent the equations of motion for the independent variables. These include the mass matrix at the upper left and the aerodynamics matrix at the upper right. The next 32 rows are the algebraic beam bending and torsion equations relating shear, moment, torque, and the deflections. Included in these relations are the 1st and 2nd moments of bending flexibility within each segment. (Elements b and g in FIG. 13). This allows a truly continuous flexible beam to be represented. Shear flexibility can be included in the term "g". Rows 53 to 60 compute the angle-of-attack at the ¾ chord of each aerodynamic panel. Rate and unsteady aerodynamic lag effects are represented here. Rows 61 to 70 allow feedback to the wing and tip control surfaces from any variable. Dynamic control equations for stabilization and control are introduced here. Rows 69 and 70 also account for the dynamic angle-of-attack at the tip controls. Row and column 71 was added so that a computed (1−cos) gust with Kussner lag could be represented. The following is a table of definitions of the symbols used in the above discussion:

| | |
|---|---|
| CS - | Control Surfaces |
| $V_e$ - | Equivalent Airspeed |
| $V_t$ - | True Airspeed |
| EI - | Sectional Bending Stiffness |
| GJ - | Sectional Tursional Stiffness |
| GW - | Gross Weight |
| HZ - | Hertz |
| KEAS - | Knots Equivalent Airspeed |
| A - <br> T - | } Aerodynamic Lag Constants |
| S - | Laplace Variable |
| KTAS - | Knots True Airspeed |
| EA - | Elastic Axis |
| g - <br> b - | } Elements in the Matrix Equation of FIG. 13 |

What is claimed is:

1. In an aircraft having flight sustaining wings, a plurality of movable control surfaces distributed along trailing portions of said wings for maneuvering the aircraft, and a separate actuator means for positioning each control surface, a structural feedback system, comprising:
strain measuring means carried by a load carrying portion of a wing, near the aircraft center, for measuring bending moment induced strain;
AOT sensor means for measuring angle-of-attack forces acting on the aircraft;
accelerometer means for measuring acceleration forces acting on the aircraft; and
actuator control means including feedback means for each control surface responsive to a summation of signals from the strain measuring means, and AOT sensor means, and the accelerometer means, for operating the actuator means to move said control surfaces in a direction and in an amount to produce aerodynamic forces on the wings for stabilizing the wings.

2. In an aircraft, relatively limber flight sustaining wings designed for strength and not stiffness,
movable control surfaces on said wings for maneuvering the aircraft;
actuator means for positioning the control surfaces; and
a structural feedback system, comprising:
strain measuring means carried by a load carrying portion of a wing, for measuring bending moment inducing strain; and
actuator control means including feedback means responsive to a signal from the strain measuring means for operating the actuator means to move control surfaces in a direction and in an amount to produce aerodynamic forces on the wings for opposing bending, to in that manner compensate for a lack in wing stiffness,
wherein the strain measuring means comprises at least one calibrated strain gage that is incapsulated within a beam member which is structurally integrated into an upper skin portion of a wing.

3. A system according to claim 2, use with a wing having a honeycomb skin structure, wherein an elongated cavity is formed in a core portion of the honeycomb skin structure, and wherein the strain gage carrying beam member is located within layers of resinous material within said cavity.

4. A system according to claim 3, wherein the strain gage carrying beam is embedded within an upper base portion of a wing adjacent a center spar.

5. A system according to claim 2, wherein the strain measuring means comprises a plurality of strain gage elements arranged to provide redundancy.

6. In a distributed load aircraft, a relatively limber flight sustaining wing designed for strength and not stiffness, having internal payload compartments, said wing being symmetrical with respect to a longitudinal center line;

movable control surfaces on said wing for maneuvering the aircraft;

actuator means for positioning the control surfaces; and a structural feedback system, comprising:

strain measuring means carried by said wing adjacent said centerline, for measuring centerline bending moment induced strain; and actuator control means including feedback means responsive to a signal from the strain measuring means for operating the actuator means to move control surfaces in a direction and in an amount to produce aerodynamic forces on the wings for opposing bending, to in that manner compensate for a lack in wing stiffness, wherein the strain measuring means comprises at least one calibrated strain gage that is incapsulated within a beam member which is structurally integrated into an upper skin portion of the wing.

7. A system according to claim 6, for use with a wing having a honeycomb skin structure, wherein an elongated cavity is formed in a core portin of the honeycomb skin structure, and wherein the strain gage carrying beam member is located within layers of a resinous material within said cavity.

8. A system according to claim 7, wherein the strain gage carrying beam is embedded with an upper base portion of a wing adjacent a center pair.

9. A system according to claim 6, wherein the strain gage means comprises a plurality of strain gage elements arranged to provide redundancy.

10. In an aircraft of a type having a plurality of control surfaces distributed along the trailing edges of its wings, each of which is independently moved by its own actuator means, a method comprising:

constructing the wings for strength and not stiffness, resulting in the wings being relatively limber;

during use of the aircraft, measuring bending moment induced strain on the relatively limber wings and moving the control surfaces in rsponse to strain in a direction and in an amount to produce forces on the wing which will act to oppose beinding an stabilize the wing;

measuring angle-of-attack forces acting on said wings, and generating a feedback signal for each control surface proportional to such forces, and utilizing such signal to move the control surfaces in a direction and in an amount for producing aerodynamic forces acting on such wing in opposition to the angle-or-attack forces; and measuring acceleration forces acting on the wings, producing a feedback signal for each control surface based thereon, and using such signals for further adjusting the control surfaces to counter such acceleration forces.

11. A method according to claim 10, comprising moving each control surface by means of a digital signal controlled actuator, and converting signals proportional to strain encountered during bending, angle-of-attack and acceleration to a digital feeback signal, and using such digital feedback signals to influence each actuator.

12. A method according to claim 10, wherein the aircraft is a distributed load aircraft.

* * * * *

UNITED STATES PATENT AND TRADEMARK OFFICE
CERTIFICATE OF CORRECTION

PATENT NO. : 4,725,020
DATED : February 16, 1988
INVENTOR(S) : Philip C. Whitener It is certified that error appears in the above-identified patent and that said Letters Patent are hereby corrected as shown below:

Column 1, line 48, "synerginic" should be -- synergistic --.

Column 2, lines 23 and 24, "feedback This" should be -- feedback. This --.

Column 3, line 3, "comparment" should be -- compartment --.

Column 4, line 2, after "The use", insert -- of --.

Column 4, line 6, "Fig." should be -- Figs. --.

Column 4, line 16, after "receive", insert -- an --; and "20 ft" should be -- 20 ft. --.

Column 4, line 39, "fedback" should be -- fed back --.

Column 5, line 19, "structure 34." should be -- structure 34). --.

Column 5, line 61, "Feighter" should be -- Freighter --.

Column 6, line 33, "laods" should be -- loads --.

Column 7, line 21, "G(S) = 1/0.05S + 1)$^2$" should be followed by a period.

Column 8, line 68, "relative to" should be underlined.

Column 9, lines 4 and 5, "dumbell" should be -- dumbbell --.

Column 9, line 67, "The following" should begin a new paragraph.

Column 10, line 5, "Tursional" should be -- Torsional -.

UNITED STATES PATENT AND TRADEMARK OFFICE
CERTIFICATE OF CORRECTION

PATENT NO. : 4,725,020
DATED : February 16, 1988
INVENTOR(S) : Philip C. Whitener It is certified that error appears in the above-identified patent and that said Letters Patent are hereby corrected as shown below:

Column 10, line 9, after "KEAS - Knots Equivalent Airspeed", insert:

-- TE -     Trailing Edge

G -      Acceleration Due to Gravity

G(S) -   Moment and Acceleration Feedback Gain -- .

Claim 3, column 10, line 63, after "claim 2," insert -- for --.

Claim 7, column 11, line 37, "portin" should be -- portion --.

Claim 8, column 12, line 2, "with" should be -- within --; and in line 3, "pair" should be -- spar --.

Claim 10, column 12, line 15, "rsponse" should be -- response --; and in line 17, "beinding an" should be -- bending and --.

Claim 11, column 12, line 35, "feeback" should be -- feedback --.

Signed and Sealed this

Twenty-fifth Day of October, 1988

Attest:

DONALD J. QUIGG

Attesting Officer

Commissioner of Patents and Trademarks